Figures 1, 2:
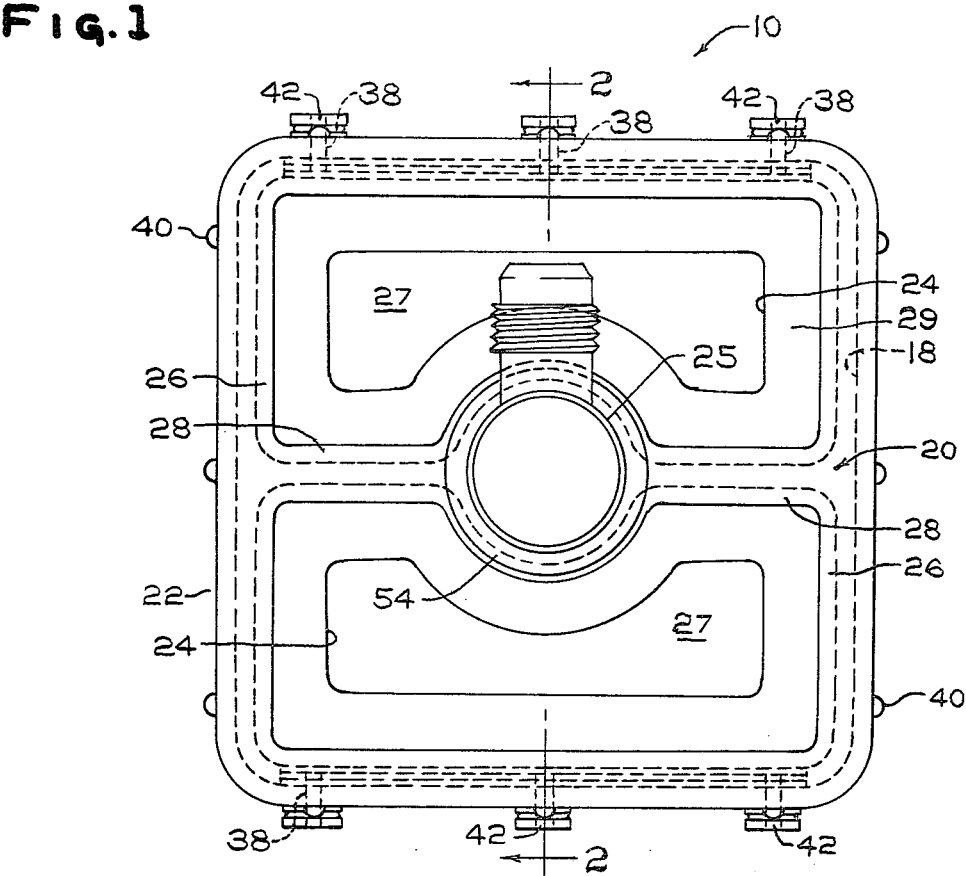

United States Patent [19]

Heimovics, Jr. et al.

[11] 4,368,009

[45] Jan. 11, 1983

[54] ASPIRATOR

[75] Inventors: John F. Heimovics, Jr., Akron; Peter P. Seabase, Cuyahoga Falls, both of Ohio

[73] Assignee: The B. F. Goodrich Company, Akron, Ohio

[21] Appl. No.: 178,430

[22] Filed: Aug. 15, 1980

[51] Int. Cl.³ .............................................. F04F 5/48
[52] U.S. Cl. .................................... 417/191; 417/179
[58] Field of Search ............... 137/895, 114; 239/412; 417/191, 190, 151, 184, 185, 182, 179

[56] References Cited

U.S. PATENT DOCUMENTS

| | | | |
|---|---|---|---|
| 2,480,925 | 9/1949 | Hirst et al. | 137/114 X |
| 2,772,829 | 12/1956 | Crawford et al. | 417/191 |
| 3,042,290 | 7/1962 | Fraebel | 417/191 |
| 3,598,504 | 8/1971 | Siravo | 417/184 |
| 3,684,404 | 8/1972 | Galbraith | 417/184 |

*Primary Examiner*—Edward K. Look
*Attorney, Agent, or Firm*—Harry F. Pepper, Jr.

[57] ABSTRACT

An aspirator used to inflate flexible structures such as aircraft evacuation slides, rafts, or the like comprises a tubular housing an atmospheric air inlet at one end of the housing, a nozzle within the housing for introduction of high pressure gas downstream of said air inlet, flapper valve means closing the air inlet and operable to open when atmospheric air is induced through the inlet by operation of said nozzle, and means within the housing to operate a device to positively lock or unlock the flapper valve means when said nozzle is not operating or operating, respectively.

8 Claims, 2 Drawing Figures

ASPIRATOR

BACKGROUND

The invention relates to aspirators used in systems for inflating flexible products such as evacuation slides, rafts, or the like, and particularly to such aspirators which utilize flapper type valve means to control the flow of inflation air through the aspirator and into the flexible product.

In typical systems used to inflate flexible products such as evacuation slides, rafts, and the like, devices are used to induce or aspirate atmospheric air into the flexible product and inflate the same.

Such aspirator devices are known wherein high pressure gas introduced into the body of the aspirator induces atmospheric or ambient air or other gas to enter the aspirator body through flapper type check valve means at an inlet to the aspirator (e.g., see U.S. Pat. No. 2,772,829) and to exit the aspirator through an outlet normally disposed within the inflation chamber of the product to be inflated. Upon completion of the inflation operation, the aforesaid valve means appropriately seats at the inlet to the aspirator to prevent release of inflation air from the flexible product back through the aspirator. However, when the flexible product wherein the aspirator is situated is designed for use as a flotation device (e.g. raft), the valve means can be forced open by wave impact. Also, the valve means of the aspirator can often be accidentally opened either by a person or by contact with some structure outside the inflatable body causing a partial or complete release of inflation air from the flexible structure.

It has been proposed to include a locking device on an aspirator (e.g., see U.S. Pat. No. 3,042,290) in order to avoid this last described problem. However, when providing such locks, structural bulk has been added to the aspirator, particularly to portions of the aspirator which are intended for disposition outside the inflatable product during the inflation operation. This additional structure can interfere with efficient operation of other inflation system components such as hoses, or the like which can become twisted around or tangled upon the added structure. Also, portions of the inflatable product can hang up, snag or tear on this additional structure.

SUMMARY

The present invention provides an aspirator with a locking device for the atmospheric air inlet valve means in which relatively simple structural additions are required, which structural additions are disposed substantially within portions of the aspirator which are to be disposed entirely within the inflatable product and out of the way of possible interference with other associated structure disposed outside the product.

More specifically, the present invention provides an aspirator of the type heretofore described comprising a tubular housing, an air inlet to said housing, a flapper type valve operable to control said air inlet, a jet style nozzle device disposed within the housing downstream of the air inlet, means to supply high pressure gas to the nozzle, a locking device within the housing movable into and out of locking relationship with the flapper valve means, and locking member actuation means responsive to high pressure gas fed to the nozzle, which actuation means is disposed within the housing downstream of the air inlet, to move said locking device into and out of locking engagement with said flapper valve means.

THE DRAWING

In the drawing:

FIG. 1 is a top view of an aspirator showing a presently preferred embodiment of the present invention; and FIG. 2 is a transverse partial sectional view of the aspirator shown in FIG. 1 taken along lines 2—2 of FIG. 1.

PRESENTLY PREFERRED EMBODIMENT

In the several views of the drawing, wherein like reference characters refer to like structural elements throughout, an aspirator constructed in accordance with a presently preferred embodiment of the invention is generally referenced 10.

The aspirator 10 comprises a tubular housing 12 with an upstream portion 14 of substantially rectangular cross section converging to a downstream portion 16 of substantially circular cross section. The downstream portion 16 can be of any convenient and efficient length, such portion being shown foreshortened in FIG. 2 for sake of brevity. In typical installations, all or a substantial portion of housing 12 extends into the inflatable slide, raft or the like (not shown) through an opening in the inflatable for that purpose.

The aspirator housing 12 can be constructed of any suitable material such as metal, plastic or the like. For adequate strength as well as facility in forming the housing 12 to the shape described, fabricating housing 12 from fiber reinforced plastic material has been found particularly advantageous.

The end 18 of the upstream or rectangular portion 14 of housing 12 defines an inlet to aspirator 10, while the end (not shown) of downstream portion 16 defines an outlet. Air from the atmosphere entering the inlet to the aspirator flows through the aspirator 10 and into the inflatable chamber of the flexible member into which all or a substantial portion of housing 12 projects.

A valve assembly, generally referenced 20, controls air flow into aspirator 10 and basically comprises an inlet or valve plate 22 and a pair of flapper type check valve members 24.

Valve plate 22 is preferably constructed of metal, such as aluminum, and is generally rectangular to conform to the end 18 of upstream portion 14 of housing 12. Valve plate 22 includes a peripheral flange 26 coextending with and secured to the end 18 of upstream portion 14 of housing 12. Flange 26 is secured by suitable fastening means such as screws 40 extending through opposing sides of upstream portion 14 of housing 12 into tapped holes in a down turned portion of peripheral flange 26 of plate 22. Flange 26 of valve plate 22 may also be further or alternately secured to the inlet end of housing 12 by suitable bonding techniques. Valve plate 22 also includes a pair of ribs 28 extending from a pair of opposite sides of peripheral flange 26 to form a circular mounting flange 25 in the center of plate 22.

The generally rectangular openings remaining in plate 22 are closed by a pair of flapper-type valve members 24 which seat against the under or downstream sides of peripheral flange 26, ribs 28 and circular flange 25 of valve plate 22. Each valve member 24 comprises a rigid plate 27, preferably of metal, such as aluminum, and a rubber sealing lip 29 extending along the margins of the upstream or outer surface of rigid plate 27. Sealing lip 29 can be secured to rigid plate 27 by suitable bonding techniques. Alternatively, the sealing lip could be affixed along the margins of valve plate 22 instead of being affixed to the valve members as shown.

A rubberized fabric hinge member 30 has one portion 32 secured to the inside of plate 27 and another portion 34 mounted against the inner wall of upstream portion 14 of housing 12 by an elongated mounting plate 36 having a plurality of threaded studs 38 projecting through the wall of upstream portion 22 for securement by suitable nuts 42. Mounted in this fashion, each valve member 24 will open in an inward or downstream direction in a pivotal movement away from each other toward opposing walls of upstream portion 14 of housing 12 in the manner illustrated by the phantom lines shown in FIG. 2. Because, in the embodiment shown, the valve members open away from each other from the center of the inlet end, upstream portion 14 is fabricated as rectangular in cross-section for better valve closure and sealing is effected if the valve members 37 are rectangular in form when opening downwardly and away from each other, as shown.

It is understood that, alternatively, with certain structural modifications, valve members could be made to open inwardly toward each other by hinging the same at the center of the inlet end adjacent ribs 28 and circular mounting flange 29. If one elects to design the valve in this fashion, upstream portion 14 can be made of circular cross section and the valve members could be substantially semi-circular without significantly affecting the closing and sealing functions of the valve members.

An inlet adapter 52 is mounted centrally of valve plate 22 on central flange 25. Inlet adapter 52 has a larger diameter portion 54 disposed upstream or outside central flange 25 and a smaller diameter portion 56 extending through flange 25 downstream and into housing 22 of aspirator 10. The bore in larger diameter portion 54 varies in size upstream of flange 25 and includes a larger diameter bore 58 and a smaller diameter bore 59. Larger diameter bore of portion 54 of adapter 52 is preferably threaded and provided with a wire member 62 and O ring seal 64 to allow connection within bore 58 of a swivel fitting 66. Swivel fitting 66 comprises an axial portion 67 and an elbow like extension portion 68 adapted for connection to a source of high pressure gas (not shown).

The bore of smaller diameter portion 56 of adapter 52 is an extension of smaller diameter bore 59 of larger diameter portion 54 which extension features a threaded portion 57 at the end thereof. The surface of smaller diameter portion 56 adjacent flange 25 is provided with a groove to receive an O-ring seal member 65.

A nozzle assembly, generally referenced 70 is connected to inlet adapter 52 to extend further downstream within aspirator housing 12. Nozzle assembly 70 comprises a nozzle head 72 having a plurality of spaced jets 74 threaded to the end of a cylindrical member 76 with a bore forming a nozzle chamber 78. The upstream end of cylindrical member 76 is threaded along an outer surface portion to appropriately connect within threaded portion 57 of bore 59 of adapter 52.

A tubular retainer ring 80 is disposed radially outside cylindrical portion 76 of nozzle assembly 70 and includes a downstream portion 82 seated in an annular groove 77 on the outer surface of cylindrical portion 76 and an upstream tapered portion 84 extending adjacent small diameter portion 56 of adapter 52 to the underside of mounting flange 25.

A cylindrical locking sleeve 90 is disposed radially outwardly of ring 80 and has a radially inwardly extending annular projection 92 slidingly engaging the outer surface of cylindrical extension 76 of nozzle assembly 70. On one side of projection 92, an annular chamber 94 is formed by projection 92 and downstream portion 82 of retainer ring 80. On the other sie of projection 92, an annular spring chamber 96 is formed between projection 92 and a radially extending annular flange 75 on nozzle assembly 70. A spring 98 is shown disposed in chamber 96 while chamber 94 is in fluid communication with chamber 78 through a port 99 through portion 76 of nozzle assembly 70.

In operation, high pressure gas from a source (not shown) enters the aspirator through fitting 66, chamber 78 and jets 74 to create a low pressure zone in the aspirator housing adjacent the jets 74. This high pressure gas also enters chamber 94 through port 99 and acts upon flange 92 against the bias of spring 98 to move locking device 90 from the position shown in phantom in FIG. 2 to that shown in solid lines in FIG. 2. Valve members 24 are thereupon unlocked, and ambient air forces these valve members open to flow through the aspirator into the inflatable product (not shown). This aspiration continues until such time as back pressure from the inflatable overcomes the pumping action induced by the high pressure jets and flow of ambient air through valve members 24 ceases because the back pressure forces these members closed. High pressure air continues through jets 74 for a short time thereafter until such time as the source of air depletes or decays in pressure to allow the spring member to return locking device 90 to the position shown in outline in FIG. 2 thereby locking valve members 24 in place.

Several and various modifications are possible to the present embodiment described in the foregoing, which modification are understood to fall within the scope of the invention as measured by the appended claims.

We claim:

1. An aspirator for inflating a flexible, inflatable product such as a raft, evacuation slide or the like comprising a housing, a nozzle assembly disposed within said housing, means for introducing gas under pressure into said nozzle assembly, an air inlet at the end of said housing, a valve assembly controlling said inlet comprising valve member movable in the downstream direction and into said housing to open said inlet and in the upstream direction to close said inlet, a locking device disposed within said housing adjacent said nozzle assembly, means within said housing and downstream of said locking device to bias said locking device into engagement with said valve members, and means within said housing and downstream of said locking device, responsive to gas under pressure introduced to said nozzle assembly, to move said locking device out of engagement with said valve members.

2. The aspirator defined in claim 1 wherein said locking device is adapted to move upstream when biased into engagement with said valve members and downstream when moved out of engagement with said valve members.

3. The aspirator defined in claim 1 wherein an upstream portion of said housing is rectangular in cross-section and a downstream portion of said housing is cylindrical in cross-section.

4. The aspirator defined in claim 2 wherein an upstream portion of said housing is rectangular in cross-section and a downstream portion of said housing is cylindrical in cross-section.

5. The aspirator defined in claim 1 wherein said valve members are adapted to move inwardly into said housing from the center of said air inlet.

6. The aspirator defined in claim 2 wherein said valve members are adapted to move inwardly into said housing from the center of said air inlet.

7. The aspirator defined in claim 3 wherein said valve members are adapted to move inwardly into said housing from the center of said air inlet.

8. The aspirator defined in claim 4 wherein said valve members are adapted to move inwardly into said housing from the center of said air inlet.

* * * * *